(12) United States Patent
Pai (10) Patent No.: US 7,605,952 B2
(45) Date of Patent: Oct. 20, 2009

(54) EXPOSURE CONTROL DEVICE

(76) Inventor: Nien-Hua Pai, 669, Ruey Kuang Road, Neihu 114, Taipei (TW) 114

( * ) Notice: Subject to any disclaimer, the term of this patent is extended or adjusted under 35 U.S.C. 154(b) by 1042 days.

(21) Appl. No.: 10/761,574

(22) Filed: Jan. 21, 2004

(65) Prior Publication Data

US 2005/0001925 A1    Jan. 6, 2005

(30) Foreign Application Priority Data

Jul. 4, 2003    (TW) ............................ 92118420 A (51) Int. Cl.
*H04N 1/04* (2006.01)

(52) U.S. Cl. ...................... 358/474; 358/471; 358/475; 358/514

(58) Field of Classification Search ................ 358/474, 358/514, 471, 475, 509, 487, 505, 506; 399/51, 399/52, 207; 355/67; 348/E9.01, 230.1; 362/310, 297; 250/491.1
See application file for complete search history.

(56) References Cited

U.S. PATENT DOCUMENTS

| | | | | |
|---|---|---|---|---|
| 4,831,418 A | * | 5/1989 | Ito et al. ...................... | 399/52 |
| 4,928,172 A | * | 5/1990 | Uehara et al. ............. | 348/230.1 |
| 4,933,754 A | * | 6/1990 | Reed et al. .................... | 358/506 |
| 4,958,189 A | * | 9/1990 | Yoshida ........................ | 399/52 |
| 6,037,584 A | * | 3/2000 | Johnson et al. ............. | 358/514 |
| 6,175,405 B1 | * | 1/2001 | Kawai ......................... | 355/67 |
| 6,621,600 B1 | * | 9/2003 | Boyd et al. .................. | 358/474 |
| 6,665,099 B1 | * | 12/2003 | Lai ............................ | 358/475 |
| 6,734,903 B1 | * | 5/2004 | Takeda et al. ............. | 348/E9.01 |
| 6,813,046 B1 | * | 11/2004 | Gindele et al. .............. | 358/505 |
| 7,064,872 B1 | * | 6/2006 | Jeran ........................... | 358/475 |
| 2003/0164992 A1 | * | 9/2003 | Sakaguchi ................... | 358/475 |
| 2005/0231768 A1 | * | 10/2005 | Hsu et al. .................... | 358/474 |

FOREIGN PATENT DOCUMENTS

JP    55-111969    8/1980

* cited by examiner

*Primary Examiner*—Houshang Safaipour
(74) *Attorney, Agent, or Firm*—Workman Nydegger (57) ABSTRACT

An exposure control device is used for adjusting light amount received by a focusing device and a photoelectric conversion device of an image scanning apparatus. The exposure control device includes a control unit and a light-transmission adjusting device. The control unit asserts a control signal according to a certain condition of the image scanning apparatus. The light-transmission adjusting device is arranged in the light path to the focusing device and the photoelectric conversion device and changes an effective light-transmission area thereof in response to the control signal to adjust light amount passing therethrough.

14 Claims, 10 Drawing Sheets

EXPOSURE CONTROL DEVICE

FIELD OF THE INVENTION

The present invention relates to an exposure control device, and more particularly to an exposure control device for use with an image scanning apparatus.

BACKGROUND OF THE INVENTION

Figure 1:
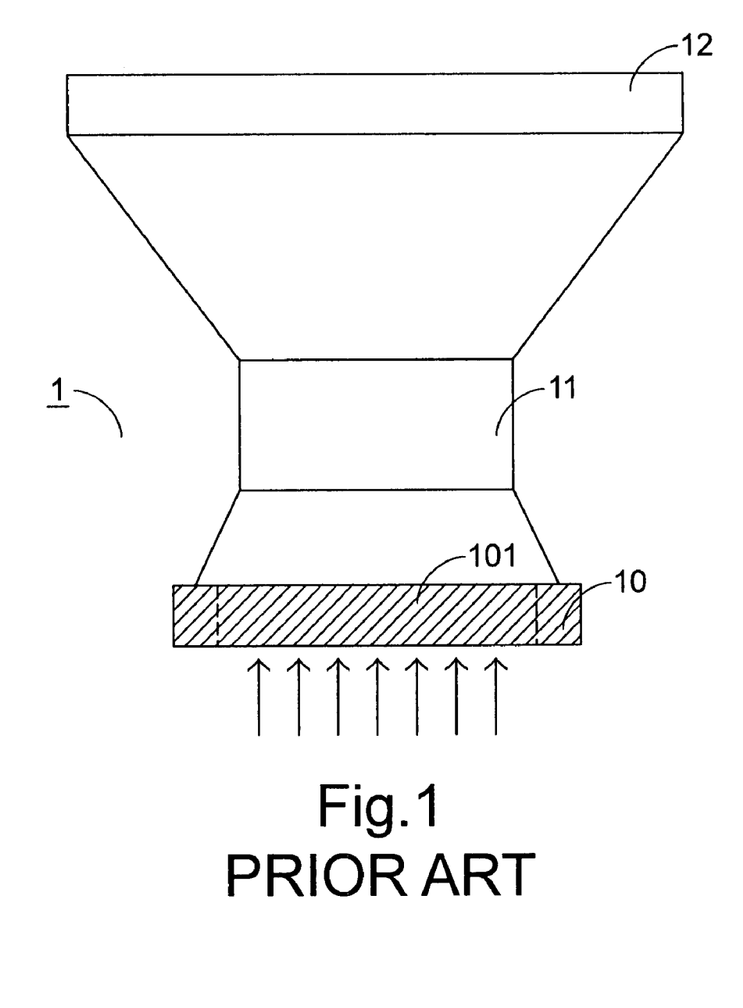
FIG. 1 is a schematic diagram showing optical devices disposed in a carriage of an image scanning apparatus.

Referring to FIG. 1, optical devices disposed in a carriage 1 of an image scanning apparatus is schematically shown. The light reflected or transmitted from a scanned object (not shown) is incident into the carriage 1 via an optical grid plate 10. By means of a lens set 11, the light is focused on a charge-coupled device (CCD) 12 for exposure, thereby implementing photoelectric conversion. In the figure, arrows are used to schematically indicate the light path.

Figure 2:
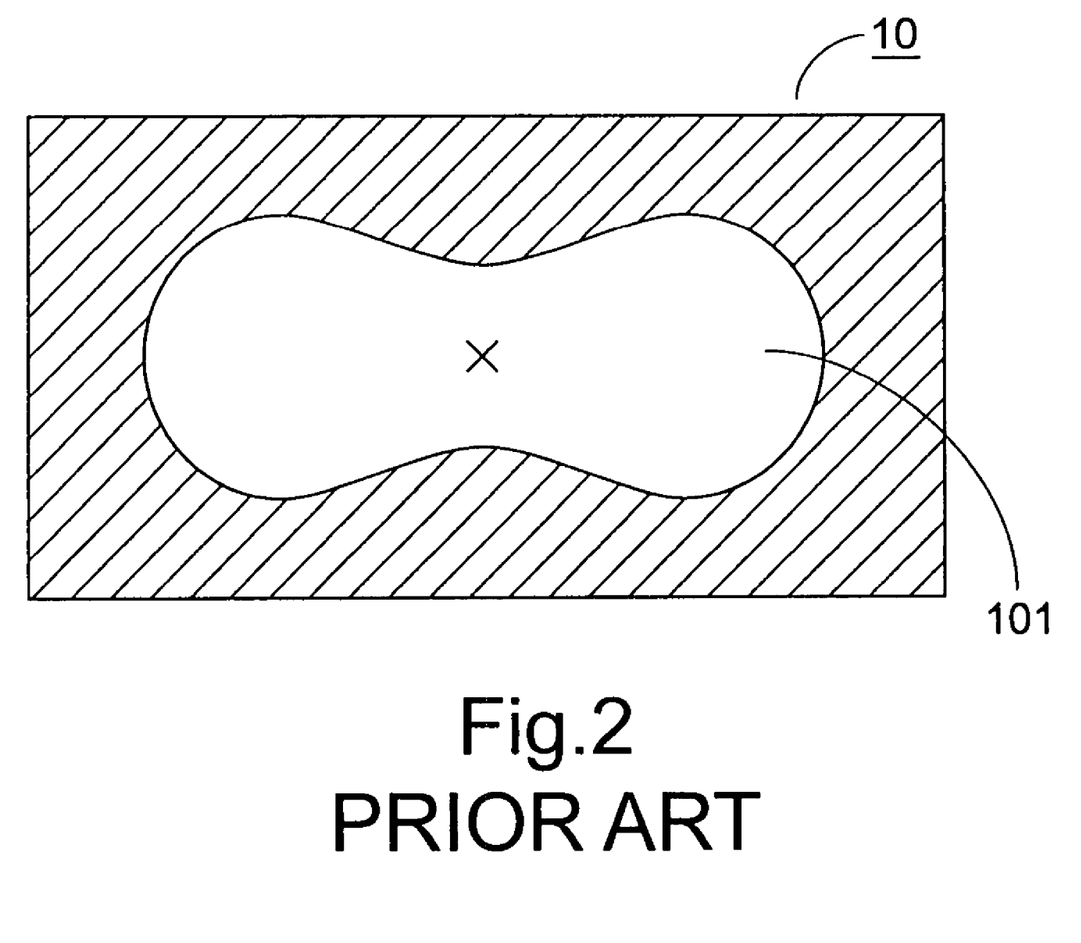
FIG. 2 is a schematic diagram showing a front view of an optical grid plate used in the carriage of FIG. 1.

A front view of a typical optical grid plate 10 is schematically shown in FIG. 2. The optical grid plate 10 has a light-transmission aperture 101 arranged in the optical path. In this figure, the symbol "x" indicates the light enters the carriage behind the plate 10 from the light-transmission aperture 101. The aperture 101 is shaped as a dumbbell as shown. That is, both side portions are larger than the middle portion in area. The aperture 101 with such shape facilitates the compensation of the relatively weak light intensity emitted by the end portions of a linear light source so as to unify the light amount reaching the lens set 11 at all positions.

Generally, the resolution of an image scanning apparatus is adjustable, and the conditions of the image scanning apparatus are tuned according to a preset resolution. For example, an image scanning apparatus is adjustable between a high resolution of 600 dpi and a low resolution of 300 dpi. As is understood by those skilled in the art, the movement of the carriage under the selected resolution 600 dpi is slower than that under the selected resolution 300 dpi. Accordingly, for each signal scan line, it is exposed less under the high resolution than that under the low resolution. If the conditions of the image scanning apparatus are preset to comply with the requirement of that high resolution, i.e. if the exposure is perfect for the high resolution scanning state, the exposure will be insufficient for the low resolution scanning state. As such, the signal-to-noise ratio of the photoelectric converted output signal will be undesirably low under the low resolution scanning state, and thus the scanning quality is adversely affected. On the other hand, if the conditions of the image scanning apparatus are preset to comply with the requirement of that low resolution, i.e. if the exposure is perfect for the low resolution scanning state, overexposure situation will be rendered for the high resolution scanning state, which might result in distortion of the scanned image.

SUMMARY OF THE INVENTION

It is an object of the present invention to provide an exposure control device for use with an image scanning apparatus, which is capable of adjusting the exposure time according to the desired preset resolution of the image scanning apparatus.

It is another object of the present invention to provide an exposure control device for use with an image scanning apparatus so as to control exposure time of the image scanning apparatus without impairing image quality of the scanned object.

In accordance with a first aspect of the present invention, there is provided an exposure control device for adjusting light amount received by a focusing device and a photoelectric conversion device of an image scanning apparatus. The exposure control device comprises a control unit and a light-transmission adjusting device. The control unit asserts a control signal according to a certain condition of the image scanning apparatus. The light-transmission adjusting device is arranged in the light path to the focusing device and the photoelectric conversion device and changes an effective light-transmission area thereof in response to the control signal to adjust light amount passing therethrough.

In an embodiment, the light-transmission adjusting device comprises a driving unit and a movable optical grid plate. The driving unit is controlled by the control unit to generate a driving force in response to the control signal. The movable optical grid plate is optionally driven by the driving force to change a position thereof so as to change the effective light-transmission area.

In an embodiment, the driving unit comprises a motor and the optical grid plate is moved by rotation.

In an embodiment, the light-transmission adjusting device comprises a driving unit, a first optical grid plate and a second optical grid plate. The driving unit is controlled by the control unit to generate a driving force in response to a first state of the control signal. The first optical grid plate is arranged in the light path to the focusing device and the photoelectric conversion device, and has a first light-transmission area. The second optical grid plate has a second light-transmission area smaller than the first light-transmission area, and is optionally driven by the driving force to be aligned with the first optical grid plate so as to reduce the effective light-transmission area.

In an embodiment, the driving unit comprises a motor coupled with the second optical grid plate for rotating the second optical grid plate to further change the effective light-transmission area according to another condition of the image scanning apparatus.

In an embodiment, the light-transmission adjusting device comprises a liquid crystal screen electrically connected to the control unit, and changing the effective light-transmission area in response to the control signal by varying darkened pixels.

In an embodiment, the certain condition of the image scanning apparatus is a selected resolution of the image scanning apparatus. The effective light-transmissible area under high resolution is smaller than that under low resolution.

In an embodiment, the certain condition of the image scanning apparatus is a predetermined comparing result of a voltage value of an output signal from the photoelectric conversion device with a threshold value. The effective light-transmissible area is enlarged when the voltage value of the output signal is smaller than the threshold value.

In an embodiment, the control unit comprises an application specific integrated circuit (ASIC) for asserting the control signal according to the certain condition of the image scanning apparatus.

In accordance with a second aspect of the present invention, there is provided an exposure control device for adjusting light amount received by a focusing device and a photoelectric conversion device of an image scanning apparatus. The exposure control device comprises a control unit, a driving unit and a movable optical grid plate. The control unit asserts a control signal according to a certain condition of the image scanning apparatus. The driving unit is controlled by the control unit to generate a driving force in response to the control signal. The movable optical grid plate is optionally driven by the driving force to change a position thereof so as to change the effective light-transmission area.

In accordance with a third aspect of the present invention, there is provided an exposure control device for adjusting light amount received by a focusing device and a photoelectric conversion device of an image scanning apparatus. The exposure control device comprises a control unit and a liquid crystal screen. The control unit asserts a control signal according to a certain condition of the image scanning apparatus. The liquid crystal screen is electrically connected to the control unit, and changes an effective light-transmission area in response to the control signal by varying darkened pixels.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
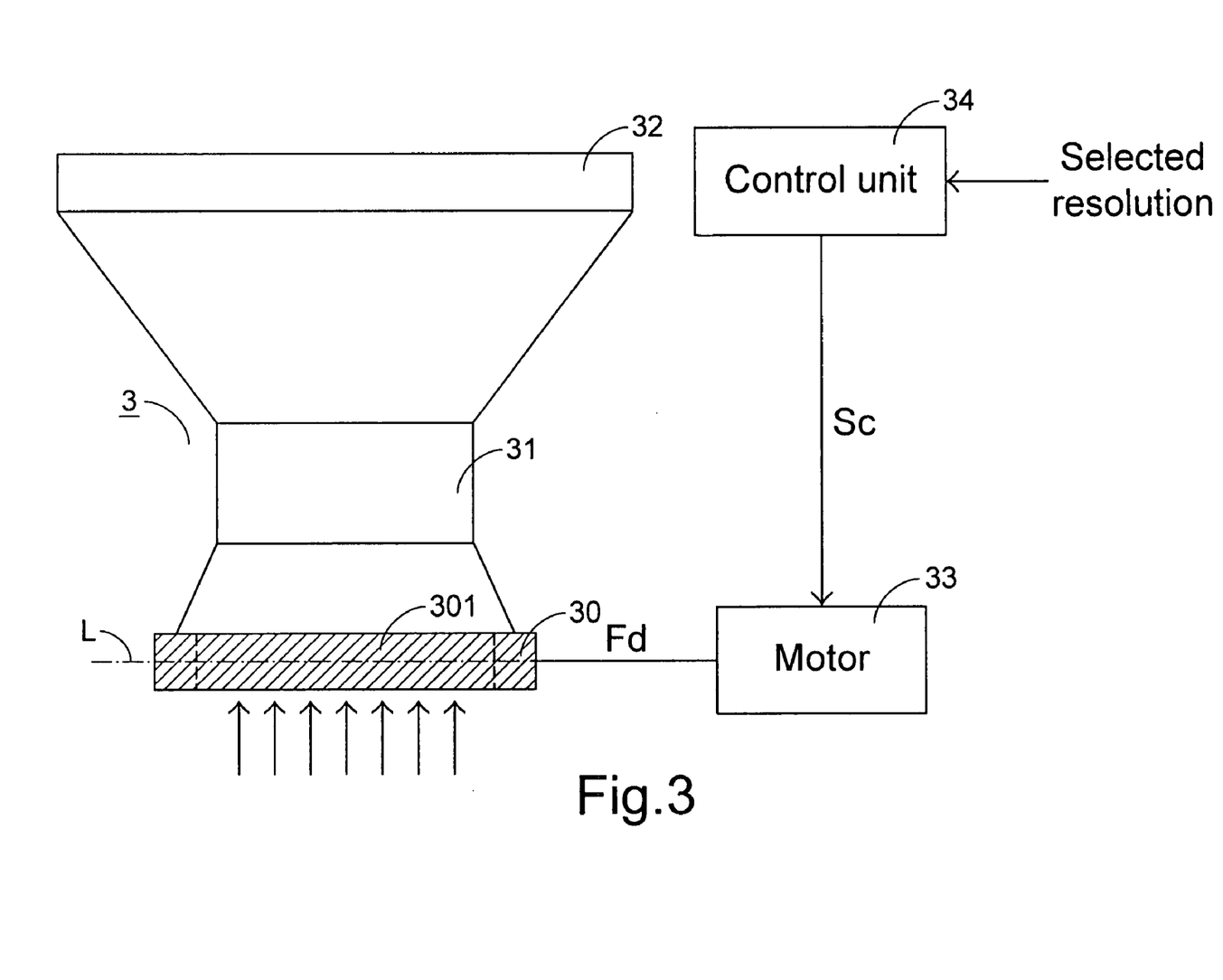
FIG. 3 is a schematic block diagram illustrating the use of an exposure control device with a carriage of an image scanning apparatus according to a first embodiment of the present invention.

Referring to FIG. 3, an exposure control device according to a preferred embodiment of the present invention is shown. The exposure control device is used for adjusting light amount into a carriage 3 according to selected resolution. The carriage 3 is disposed therein a lens set 31 and a charge-coupled device 32. The light reflected or transmitted from a scanned object (not shown) is incident into the carriage 3 via a light-transmission region 301 of an optical grid plate 30 for controlling light amount for exposure. In the figure, arrows are used to schematically indicate the light path. By means of the lens set 31, the light is focused on the charge-coupled device 32 for exposure, thereby implementing photoelectric conversion. In addition to the optical grid plate 30, the exposure control device further includes a motor 33 and a control unit 34. For a purpose of adjusting light amount received by the charge-coupled device 32 of the carriage 3, the optical grid plate 30 is rotatable about the axis L by the motor 33 so as to change the effective light-transmissible area of the region 301. For a low resolution, a relatively large area of the region 301 is required for passing therethrough more light amount. On the other hand, for a high resolution, the light amount penetrating through the region 301 should be reduced relative to the low resolution in order to maintain uniform imaging quality. Therefore, according to the selected resolution of the image scanning apparatus, a control signal Sc for changing the effective light-transmissible area is optionally asserted by the control signal 34. The control unit 34 is implemented by an application specific integrated circuit (ASIC). In response to the control signal Sc, the motor 33 generates a driving force Fd to rotate the optical grid plate 30 about the axis L so as to change the effective light-transmission area.

Figure 4A:
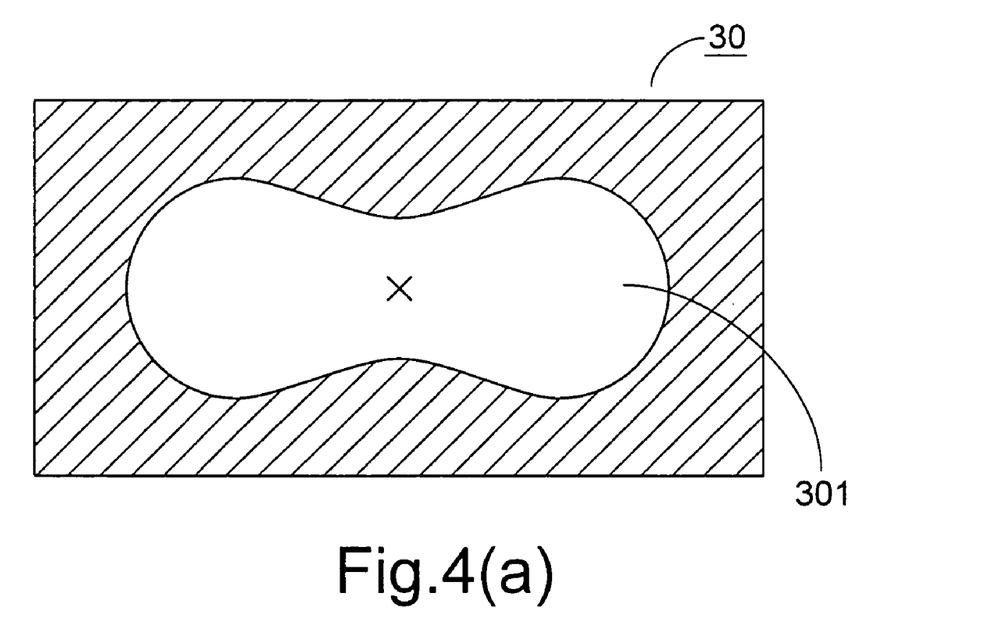
FIGS. 4(a) and 4(b) are schematic diagrams showing front perspective views of a movable optical grid plate in FIG. 3 with a high and a low effective light-transmissible areas, respectively.
Figure 4B:
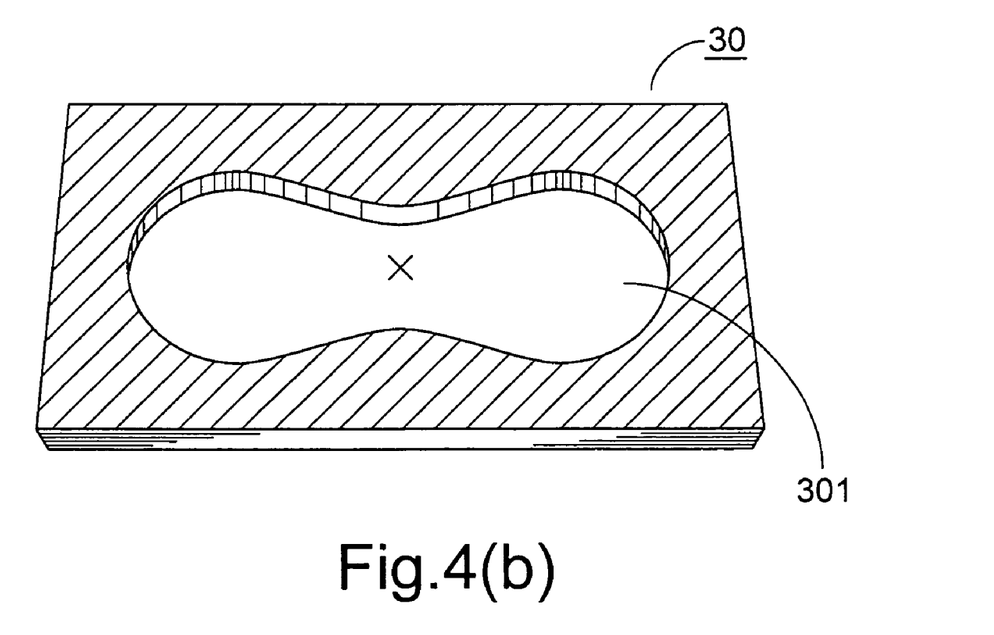

In this embodiment, while the optical grid plate 30 is arranged upright and thus perpendicular to the light path when the low resolution is selected, it becomes slant to reduce the effective light-transmissible area when the high resolution is selected. The area change is shown in FIGS. 4(a) and 4(b). In this figure, the symbol "x" indicates the light enters the carriage behind the plate 30 from the light-transmission region 301. The light transmission region 301 such as an aperture is shaped as a dumbbell. The light amount to be focused on the charge-coupled device 32 is controlled by adjusting the effective light-transmissible area of the movable optical grid plate 30 as described above. As shown in FIG. 4(a), the aperture 301 has a largest effective light-transmissible area because the movable optical grid plate 30 is perpendicular to the light path. Alternatively, the aperture 301 can have a reduced effective light-transmissible area, as shown in FIG. 4(b), by rotating the optical grid plate 30. In such way, the problems of insufficient exposure situation for the low resolution scanning state or the overexposure situation for the high resolution scanning state can be solved.

Figure 5:
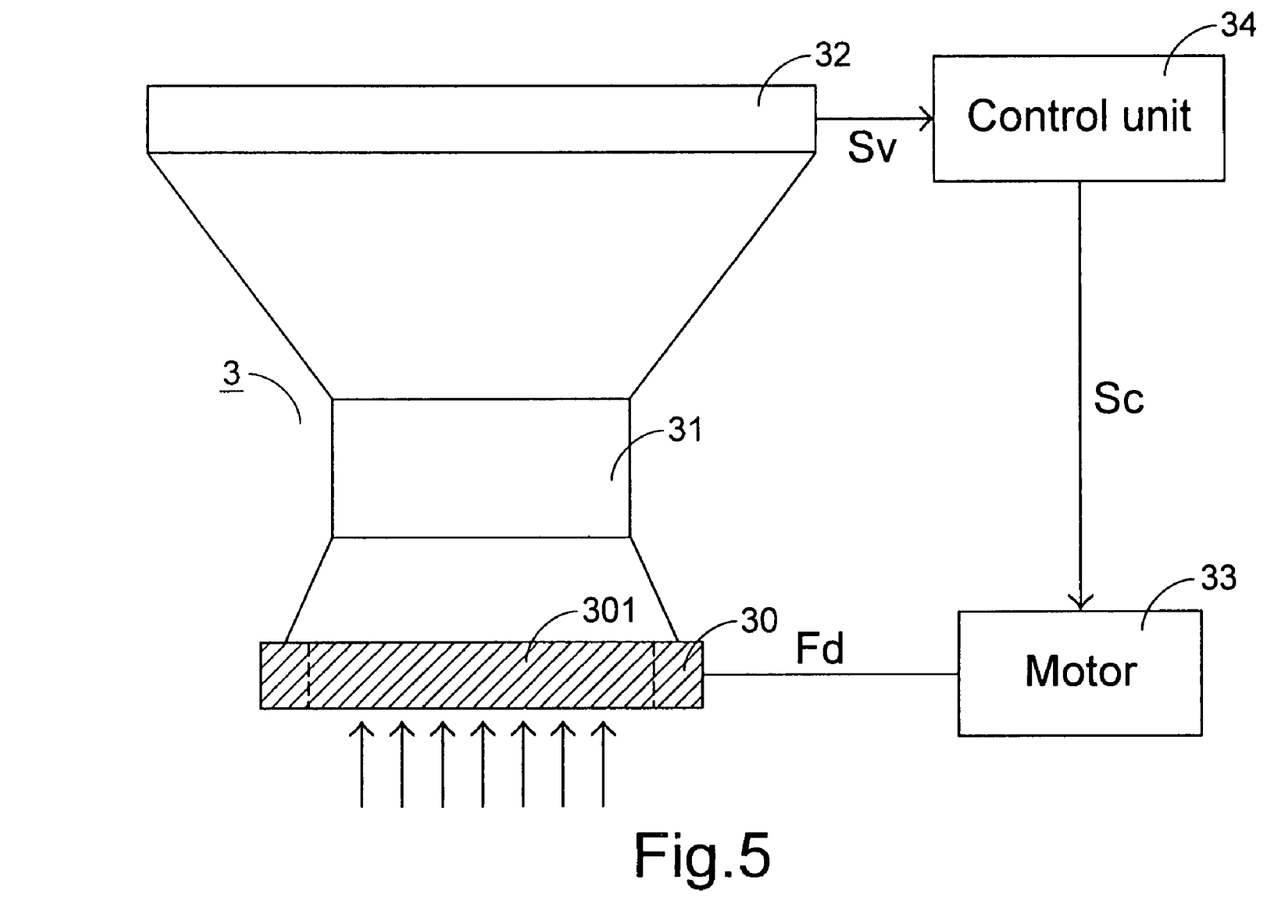
FIG. 5 is a schematic block diagram illustrating the use of an exposure control device with a carriage of an image scanning apparatus according to a second embodiment of the present invention.

The effective light-transmissible area in the above embodiment is adjusted according to a selected resolution. In some cases, the adjustment of the effective light-transmissible area is also preferred to compensate the imaging deficiency resulting from the uneven output voltage. Therefore, in another embodiment, the effective light-transmissible area is adjusted by an exposure control device shown in FIG. 5 according to a voltage value of an output signal Sv generated from the charge-coupled device 32. When the voltage value of the output signal Sv is larger than a threshold value, the effective light-transmissible area is reduced. Whereas, when the voltage value of the output signal Sv is smaller than the threshold value, the optical grid plate 30 is rotated to provide an enlarged effective light-transmissible area.

Figure 6:
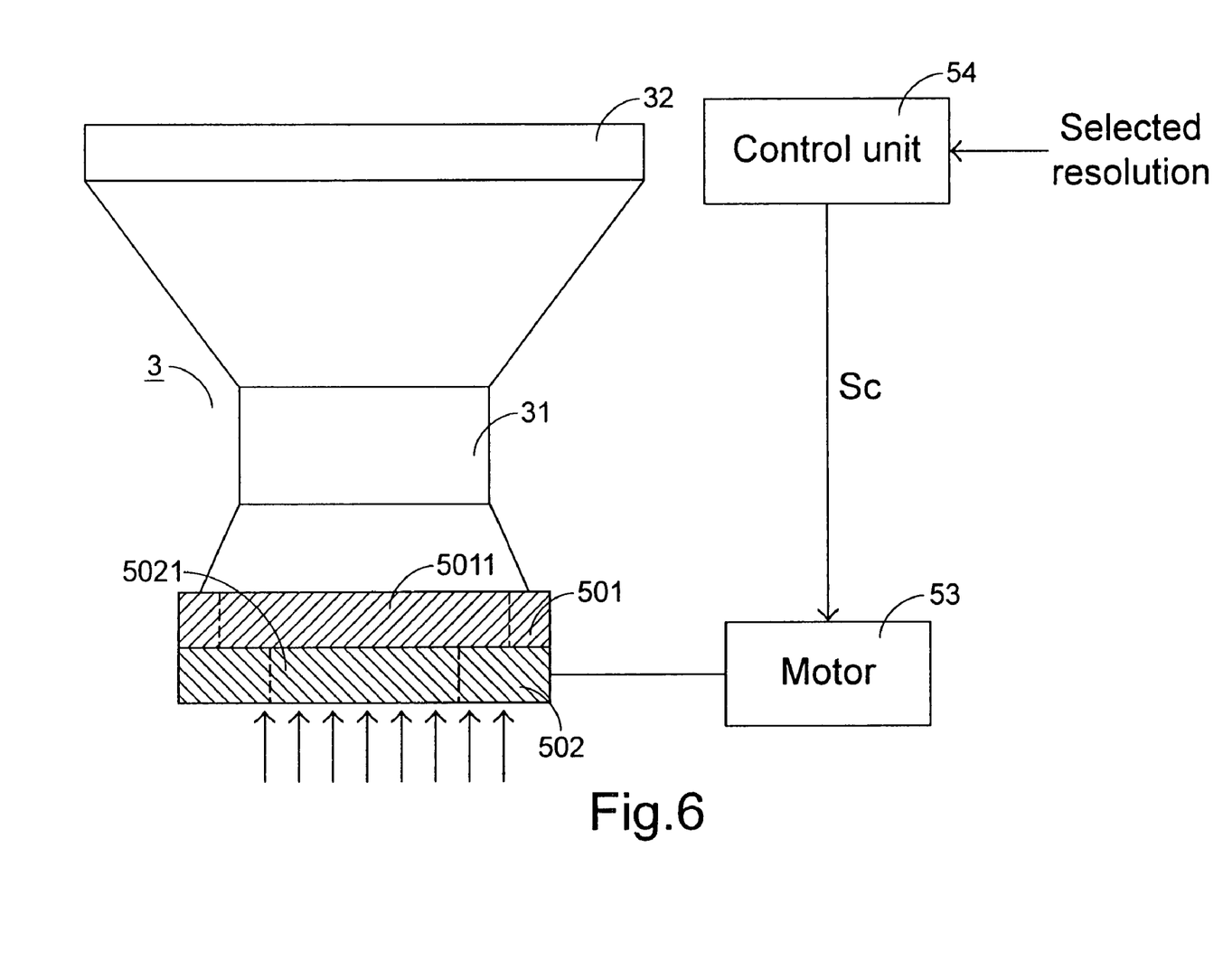
FIG. 6 is a schematic block diagram illustrating the use of an exposure control device with a carriage of an image scanning apparatus according to a third embodiment of the present invention.

A further embodiment of an exposure control device is illustrated in FIG. 6. In this embodiment, the carriage and the optical devices included therein are similar to those shown in FIG. 3, and are not to be redundantly described herein. The exposure control device includes a first optical grid plate 501, a second optical grid plate 502, a motor 53 and a control unit 54. The control unit 54 is implemented by an application specific integrated circuit (ASIC). According to a selected resolution of the image scanning apparatus, a control signal Sc for changing the effective light-transmissible area is optionally asserted by the control signal 54. In response to the control signal Sc, the motor 53 generates a driving force Fd to move the second optical grid plate 502 to separate from or align with the first optical grid plate 501.

Figure 7A:
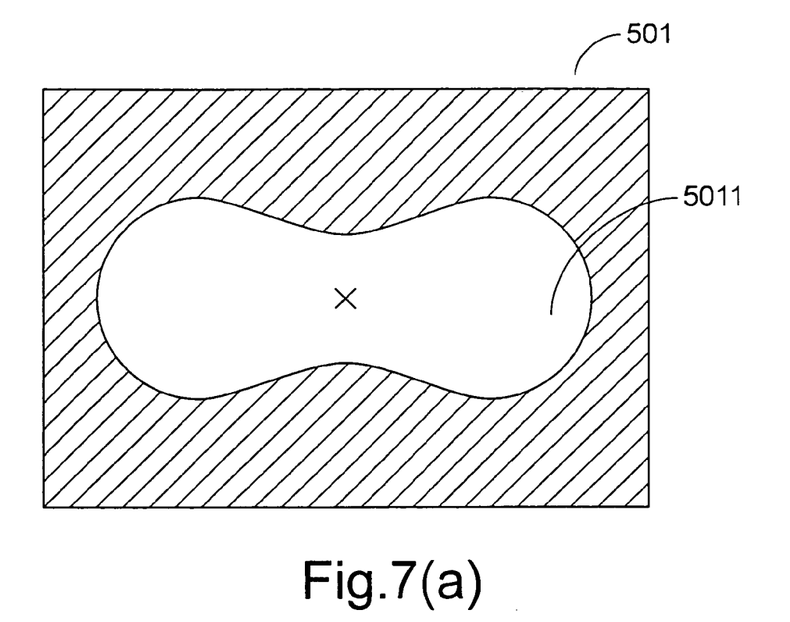
FIGS. 7(a) and 7(b) are schematic diagrams showing front views of single and composite optical grid plates in FIG. 6 for creating a high and a low effective light-transmissible areas, respectively.
Figure 7B:
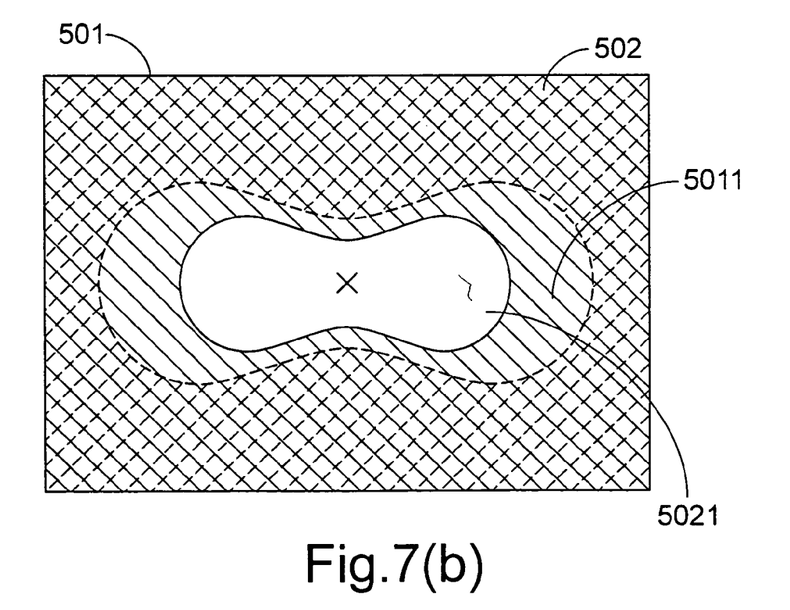

As shown in FIG. 7(a), when a low resolution is selected, the first optical grid plate 501 is used only and made to perpendicular to the light path so as to obtain a largest effective light-transmissible area of the light-transmission region 5011. Whereas, as shown in FIG. 7(b), when a high resolution is selected, the second optical grid plate 502 is driven by the driving force Fd to be put into the light path and aligned with the first optical grid plate 501. By this way, the effective light-transmissible area is reduced to equal to the area of the light transmission region 5021 of the second optical grid plate 502. Of course, if an even smaller effective light-transmissible area is required, the second optical grid plate 502 or the composite optical grid plates 501 and 502 can be rotated in a way previously described.

Likewise, the effective light-transmissible area can also be adjusted according to a voltage value of an output signal Sv generated from the charge-coupled device 32, as mentioned above. The second optical grid plate 502 or the composite optical grid plates 501 and 502 are optionally moved to create the required effective light-transmissible area.

Figure 8:
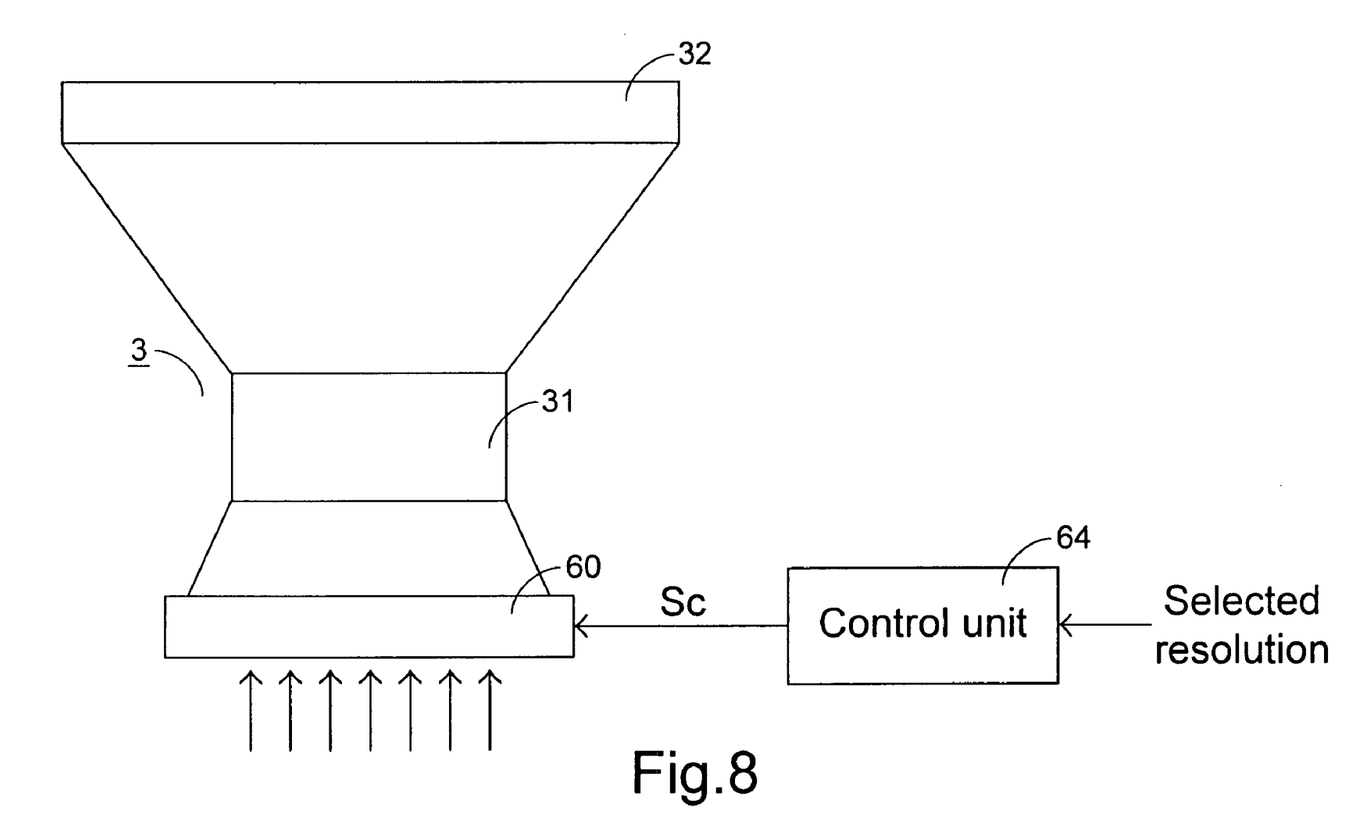
FIG. 8 is a schematic block diagram illustrating the use of an exposure control device with a carriage of an image scanning apparatus according to a fourth embodiment of the present invention.

A further embodiment of an exposure control device is illustrated in FIG. 8. In this embodiment, the carriage and the optical devices included therein are similar to those shown in FIG. 3, and are not to be redundantly described herein. The light reflected or transmitted from a scanned object (not shown) is incident into the carriage 3 via an optical grid plate 60, which is a liquid crystal screen and adjusts an effective light-transmissible area by differentially darkening selected portions thereof. For a purpose of adjusting light amount received by the charge-coupled device 32 in the carriage 3, the exposure control device further comprises a control unit 64. The control unit 64 is implemented by an application specific integrated circuit (ASIC). According to a selected resolution of the image scanning apparatus, a control signal Sc is asserted by the control signal 64. In response to the control signal Sc, the effective light-transmission area is adjusted by varying darkened pixels.

Figure 9A:
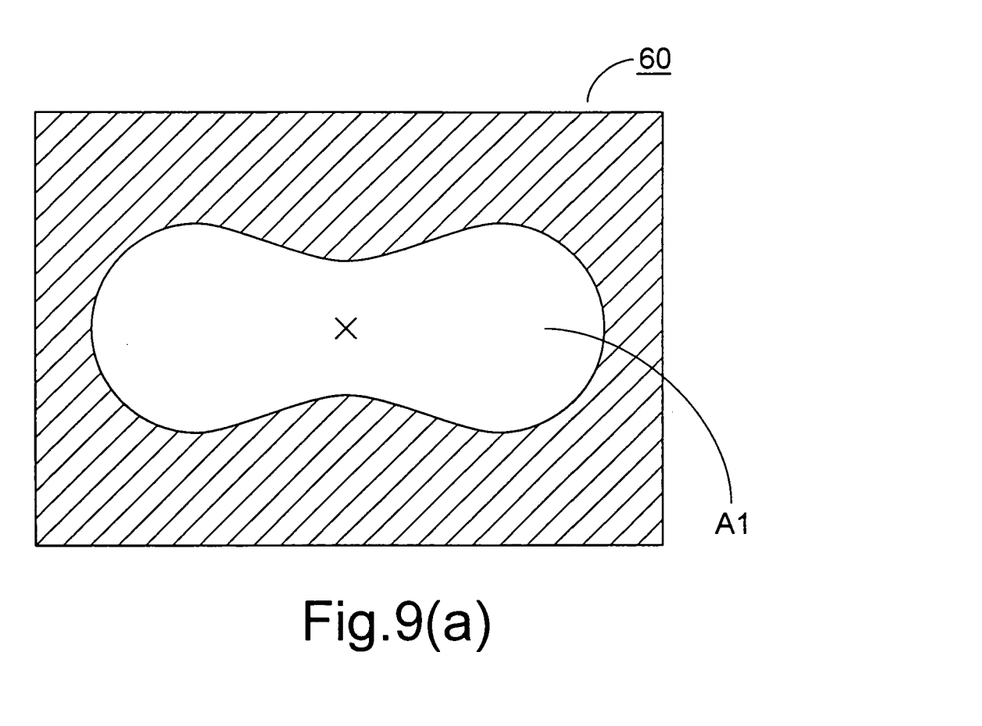
FIGS. 9(a) and 9(b) are schematic diagrams showing front views of an optical grid plate in FIG. 8 electronically adjusted to have a high and a low effective light-transmissible areas, respectively.
Figure 9B:
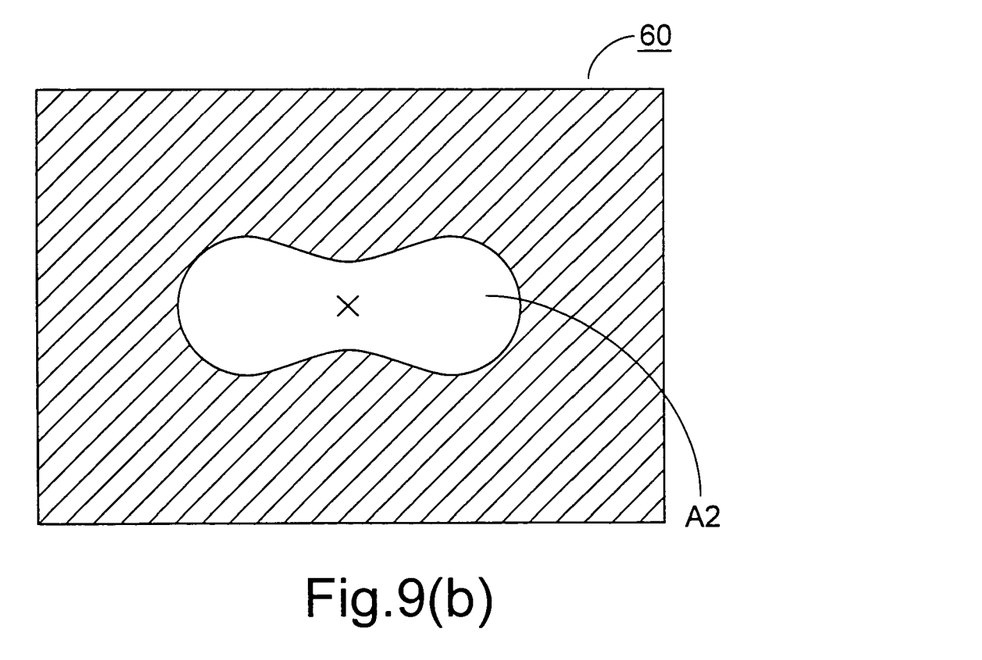

While FIG. 9(a) reveals a high effective light-transmissible area Al when a low resolution is selected, FIG. 9(b) reveals the reduction of the effective light-transmissible area as A2 by increasing darkened pixels when a high resolution is selected.

Figure 10:
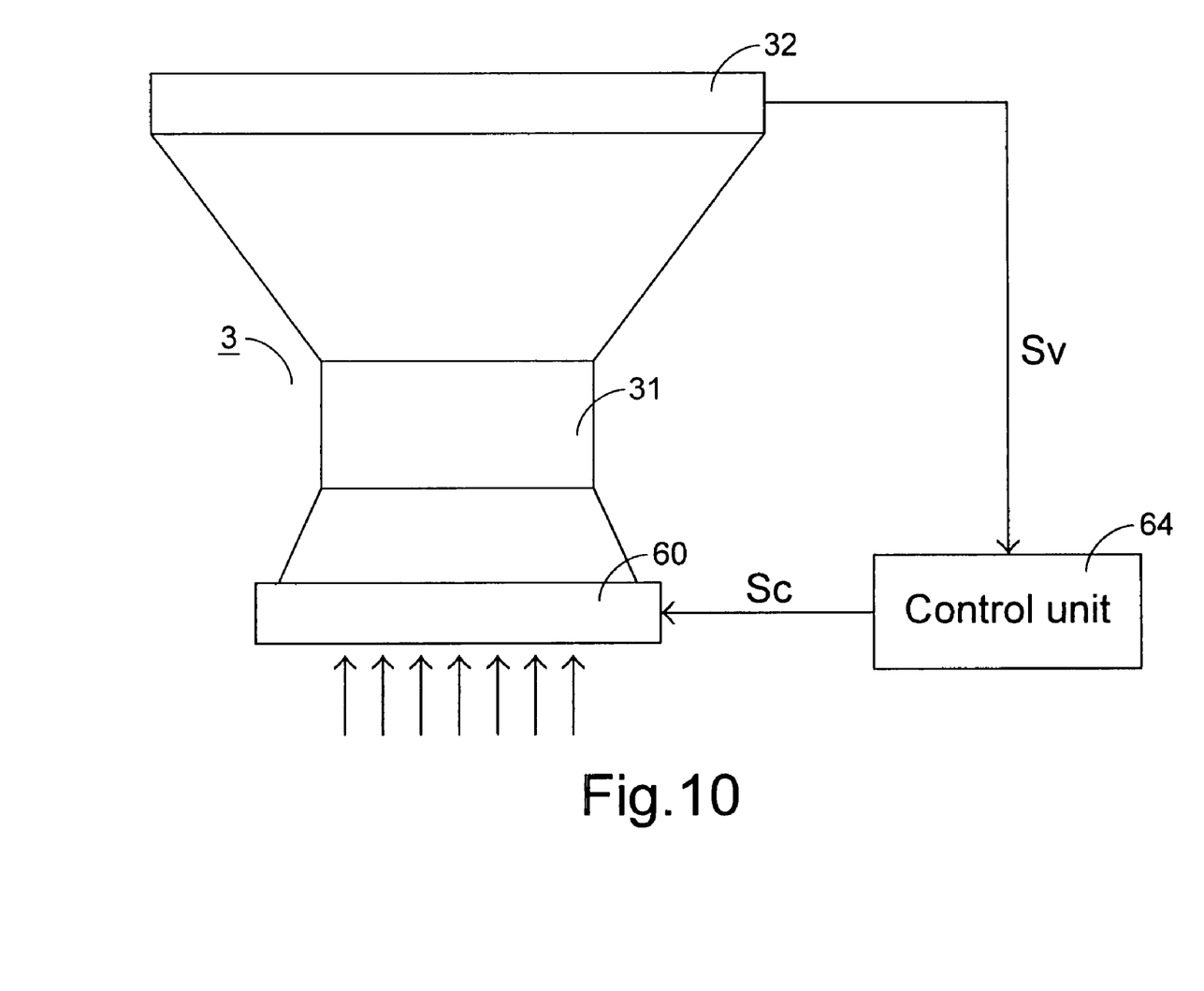
FIG. 10 is a schematic block diagram illustrating the use of an exposure control device with a carriage of an image scanning apparatus according to a fifth embodiment of the present invention.

Likewise, the effective light-transmissible area can also be adjusted according to a voltage value of an output signal Sv generated from the charge-coupled device 32, as is shown in FIG. 10.

From the above description, the exposure control device of the present invention is capable of adjusting the light amount reaching the charge-coupled device for exposure according to the current condition of the image scanning apparatus. By properly compensation of light amount, the image quality of the scanned object under various resolutions or suffering from fluctuating output voltages can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An exposure control device for adjusting an amount of light received by a focusing device and a photoelectric conversion device of an image scanning apparatus, the exposure control device comprising:

a control unit configured to generate a control signal according to a certain condition of said image scanning apparatus; and a light-transmission adjusting device arranged in a light path from an object to said focusing device and said photoelectric conversion device, the light-transmission adjusting device being positioned to change an effective light-transmission area thereof in response to said control signal to adjust light amount passing therethrough, the light-transmission adjusting device comprising:

a driving unit controlled by said control unit to generate a driving force in response to said control signal;

a first optical grid plate arranged in the light path, the first optical grid plate having a first light-transmission area; and a second optical grid plate having a second light-transmission area smaller than the first light-transmission area and selectively driven by said driving force to be aligned with the first optical grid plate so as to reduce said effective light transmission area;

wherein said certain condition of said image scanning apparatus is a selected resolution of said image scanning apparatus; and wherein said effective light-transmissible area under high resolution is smaller than that under low resolution.

2. The exposure control device according to claim 1 wherein said driving unit comprises a motor and said second optical grid plate is moved by rotation.

3. The exposure control device according to claim 1 wherein said driving unit comprises a motor coupled with said second optical grid plate for slanting said second optical grid plate to further change said effective light-transmission area according to another condition of said image scanning apparatus.

4. The exposure control device according to claim 1 wherein said certain condition of said image scanning apparatus is a predetermined comparing result of a voltage value of an output signal from said photoelectric conversion device with a threshold value.

5. The exposure control device according to claim 4 wherein said effective light-transmissible area is enlarged when said voltage value of said output signal is smaller than said threshold value.

6. The exposure control device according to claim 1 wherein said control unit comprises an application specific integrated circuit (ASIC) for asserting said control signal according to said certain condition of said image scanning apparatus.

7. An exposure control device for adjusting an amount of light received by a focusing device and a photoelectric conversion device of an image scanning apparatus, the exposure control device comprising:

a control unit configured to generate a control signal according to a certain condition of said image scanning apparatus;

a driving unit controlled by said control unit and configured to generate a driving force in response to said control signal; and an optical grid plate having an aperture, wherein rotation of the optical grid plate by said driving force changes an effective light-transmission area of the aperture by rotating the optical grid plate;

wherein said certain condition of said image scanning apparatus is a selected resolution of said image scanning apparatus; and wherein said effective light-transmissible area under high resolution is smaller than that under low resolution.

8. The exposure control device according to claim 7 wherein said driving unit comprises a motor and said optical grid plate is moved by rotation.

9. The exposure control device according to claim 7 wherein said certain condition of said image scanning apparatus is a predetermined comparing result of a voltage value of an output signal from said photoelectric conversion device with a threshold value.

10. The exposure control device according to claim 9 wherein said effective light-transmissible area is enlarged when said voltage value of said output signal is smaller than said threshold value.

11. An exposure control device, comprising:
a control unit configured to generate a control signal;
an optical grid plate having a region with a light-transmissible area, the light transmissible area having an elongate shape with a narrowed central portion; and
means for rotating the optical grid plate to change the effective light-transmissible area of the region in response to the control signal;
wherein the optical grid plate is perpendicular to a light path when the control signal identifies a low resolution and wherein the optical grid plate is slanted when the control signal identifies a high resolution.

12. The exposure control device of claim 11, wherein the control unit is configured to assert the control signal in response to a selected resolution of the scanning apparatus.

13. The exposure control device of claim 11, wherein the control unit is configured to assert the control signal in response to a comparison of an output signal from the photoelectric conversion device against a threshold value.

14. The exposure control device of claim 13, wherein the output signal is a voltage and the effective light-transmissible area is enlarged when the voltage is smaller than the threshold value.

* * * * *

UNITED STATES PATENT AND TRADEMARK OFFICE
CERTIFICATE OF CORRECTION

PATENT NO.       : 7,605,952 B2
APPLICATION NO.  : 10/761574
DATED            : October 20, 2009
INVENTOR(S)      : Pai

It is certified that error appears in the above-identified patent and that said Letters Patent is hereby corrected as shown below:

Delete the title page and substitute therefore the attached title page showing corrected illustrative FIG 7(a).

Column 7
Line 21, delete "light transmissible" and insert --light-transmissible--

Signed and Sealed this

Twenty-second Day of December, 2009

David J. Kappos
*Director of the United States Patent and Trademark Office*

(12) United States Patent
Pai (10) Patent No.: US 7,605,952 B2
(45) Date of Patent: Oct. 20, 2009

(54) EXPOSURE CONTROL DEVICE

(76) Inventor: Nien-Hua Pai, 669, Ruey Kuang Road, Neihu 114, Taipei (TW) 114

(*) Notice: Subject to any disclaimer, the term of this patent is extended or adjusted under 35 U.S.C. 154(b) by 1042 days.

(21) Appl. No.: 10/761,574

(22) Filed: Jan. 21, 2004

(65) Prior Publication Data

US 2005/0001925 A1 Jan. 6, 2005

(30) Foreign Application Priority Data

Jul. 4, 2003 (TW) .............................. 92118420 A (51) Int. Cl.
*H04N 1/04* (2006.01)
(52) U.S. Cl. ............... 358/474; 358/471; 358/475; 358/514
(58) Field of Classification Search ............... 358/474, 358/514, 471, 475, 509, 487, 505, 506; 399/51, 399/52, 207; 355/67; 348/E9.01, 230.1; 362/310, 297; 250/491.1
See application file for complete search history.

(56) References Cited

U.S. PATENT DOCUMENTS

| | | | |
|---|---|---|---|
| 4,831,418 A * | 5/1989 | Ito et al. ..................... 399/52 |
| 4,928,172 A * | 5/1990 | Uehara et al. ............. 348/230.1 |
| 4,933,754 A * | 6/1990 | Reed et al. ................. 358/506 |
| 4,958,189 A * | 9/1990 | Yoshida ....................... 399/52 |
| 6,037,584 A * | 3/2000 | Johnson et al. ............. 358/514 |
| 6,175,405 B1 * | 1/2001 | Kawai ......................... 355/67 |
| 6,621,600 B1 * | 9/2003 | Boyd et al. ................. 358/474 |
| 6,665,099 B1 * | 12/2003 | Lai ............................. 358/475 |
| 6,734,903 B1 * | 5/2004 | Takeda et al. ............. 348/E9.01 |
| 6,813,046 B1 * | 11/2004 | Gindele et al. ............. 358/505 |
| 7,064,872 B1 * | 6/2006 | Jeran ........................... 358/475 |
| 2003/0164992 A1 * | 9/2003 | Sakaguchi ................... 358/475 |
| 2005/0231768 A1 * | 10/2005 | Hsu et al. .................... 358/474 |

FOREIGN PATENT DOCUMENTS

JP   55-111969   8/1980

* cited by examiner

*Primary Examiner*—Houshang Safaipour
(74) *Attorney, Agent, or Firm*—Workman Nydegger (57) ABSTRACT

An exposure control device is used for adjusting light amount received by a focusing device and a photoelectric conversion device of an image scanning apparatus. The exposure control device includes a control unit and a light-transmission adjusting device. The control unit asserts a control signal according to a certain condition of the image scanning apparatus. The light-transmission adjusting device is arranged in the light path to the focusing device and the photoelectric conversion device and changes an effective light-transmission area thereof in response to the control signal to adjust light amount passing therethrough.

14 Claims, 10 Drawing Sheets

UNITED STATES PATENT AND TRADEMARK OFFICE
CERTIFICATE OF CORRECTION

PATENT NO. : 7,605,952 B2  
APPLICATION NO. : 10/761574  
DATED : October 20, 2009  
INVENTOR(S) : Nien-Hua Pai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

Fourteenth Day of December, 2010

David J. Kappos
*Director of the United States Patent and Trademark Office*